United States Patent
Lang et al.

(10) Patent No.: US 12,360,842 B2
(45) Date of Patent: Jul. 15, 2025

(54) CROSS-SYSTEM CONFIGURATION CHECKS

(71) Applicant: SAP SE, Walldorf (DE)

(72) Inventors: Georg Lang, Ludwigshafen (DE); Toni Fabijancic, Eppelheim (DE)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 17/730,560

(22) Filed: Apr. 27, 2022

(65) Prior Publication Data

US 2023/0350747 A1 Nov. 2, 2023

(51) Int. Cl.
| | |
|---|---|
| *G06F 11/08* | (2006.01) |
| *G06F 11/16* | (2006.01) |
| *G06F 16/25* | (2019.01) |
| *G06F 16/901* | (2019.01) |

(52) U.S. Cl.
CPC .......... *G06F 11/08* (2013.01); *G06F 11/1658* (2013.01); *G06F 16/258* (2019.01); *G06F 16/902* (2019.01)

(58) Field of Classification Search
CPC .... G06F 11/08; G06F 11/1658; G06F 16/258; G06F 16/902
See application file for complete search history.

(56) References Cited

U.S. PATENT DOCUMENTS

| | | | | |
|---|---|---|---|---|
| 11,036,497 B1* | 6/2021 | Winemiller | ......... | G06F 11/3604 |
| 2002/0161754 A1* | 10/2002 | Janssen | ................. | G06F 16/258 |
| 2007/0283341 A1* | 12/2007 | Wakiyama | .............. | G06F 11/08 |
| | | | | 717/168 |
| 2010/0185634 A1* | 7/2010 | Eggebraaten | ........... | G06F 16/88 |
| | | | | 707/756 |
| 2011/0078183 A1* | 3/2011 | Thormaehlen | ...... | G06F 16/2457 |
| | | | | 707/E17.014 |
| 2014/0130036 A1* | 5/2014 | Gurikar | ..................... | G06F 8/62 |
| | | | | 717/176 |

(Continued)

OTHER PUBLICATIONS

SAP, Customizing Cross-System Tools, Release 4.6C, pp. 1-39. (Year: 2001).*

(Continued)

*Primary Examiner* — Cheyne D Ly
(74) *Attorney, Agent, or Firm* — Fountainhead Law Group, PC (57) ABSTRACT

Embodiments perform configuration checking between data types of table fields, in order to determine mismatches therebetween. A configuration check request including a parameter identifying a system is received. A first data type is retrieved based upon the parameter. The first data type is compared with a second, different retrieved data type to determine a mismatch. In some embodiments the first data type and the second data type may be retrieved from different systems, with the mismatch revealing inter-system inconsistency. According to certain embodiments, the first data type and the second data type may be retrieved from a same system, with the mismatch revealing intra-system inconsistency. A configuration check report is generated from the mismatch and communicated to a user, for use in proactively correcting inconsistency. Embodiments may also retrieve values of the data types, as part of value help functionality.

16 Claims, 8 Drawing Sheets

(56) References Cited

U.S. PATENT DOCUMENTS

2016/0170977 A1* 6/2016 Engelko ............... G06F 16/284
707/609
2018/0137158 A1* 5/2018 Hoffmann ............ G06F 16/221

OTHER PUBLICATIONS

Kharitonov, V., SAP.how, how to compare customizing tables between 2 systems, pp. 1-3. (Year: 2020).*
Tuncer et al., ConfEx: A Framework for Automating Text-based Software Configuration Analysis in the Cloud, arXiv:2008.08656, pp. 1-12. (Year: 2020).*
Simmonds "Using the SAP Cross-System Viewer" dated Dec. 10, 2020, downloaded Nov. 19, 2021 from https://eursap.eu/2020/12/10/blog-using-the-sap-cross-system-viewer; 7 pages.

* cited by examiner

Change View "Types of Billable Items": Overview

New Entries | BC Set: Change Field Values

Types of Billable Items

| BillItem Type | Name of Billable Item Type |
|---|---|
| 0001 | Billable Item Type 0001 |
| TSCI | |
| TSCR | |
| TSCT | |
| UNIT | |
| Y001 | Receivable/Payable |
| ZSCO | Service Cost |

FIG. 5

Health Check: *CC_CI_BITTYPE_CHECK*

System/Table/Field Definition:

| System | Tablename | Fieldname |
|---|---|---|
| | BITTYPE_CUSTOMIZING | BITTYPE |
| CC | | BITTYPE |
| CI | TFK8I02 | | check:
CC-BITTYPE_CUSTOMIZING-BITTYPE [ENTRIES INCLUDED IN] CI-TFK8I02-BITTYPE

CROSS-SYSTEM CONFIGURATION CHECKS

BACKGROUND

Unless otherwise indicated herein, the approaches described in this section are not prior art to the claims in this application and are not admitted to be prior art by inclusion in this section.

The increasing adoption of cloud computing architectures can result in the fragmentation of system landscapes. Moreover, such landscapes may be provided by multiple vendors, enhancing connectivity concerns.

Establishing reliable and seamless integration between the settings of different members of a computer landscape can be a laborious task. Lack of compatibility between landscape members can lead to errors or inconsistencies between data.

SUMMARY

Embodiments perform configuration checking between data types of table fields, in order to determine mismatches therebetween. A configuration check request including a parameter identifying a system is received. A first data type is retrieved based upon the parameter. The first data type is compared with a second, different retrieved data type to determine a mismatch. In some embodiments the first data type and the second data type may be retrieved from different systems, with the mismatch revealing inter-system inconsistency. According to certain embodiments, the first data type and the second data type may be retrieved from a same system, with the mismatch revealing intra-system inconsistency. A configuration check report is generated from the mismatch and communicated to a user, for use in proactively correcting inconsistency. Embodiments may also retrieve values of the data types, as part of value help functionality.

The following detailed description and accompanying drawings provide a better understanding of the nature and advantages of various embodiments.

DETAILED DESCRIPTION

Described herein are methods and apparatuses that perform configuration checking in a system landscape. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
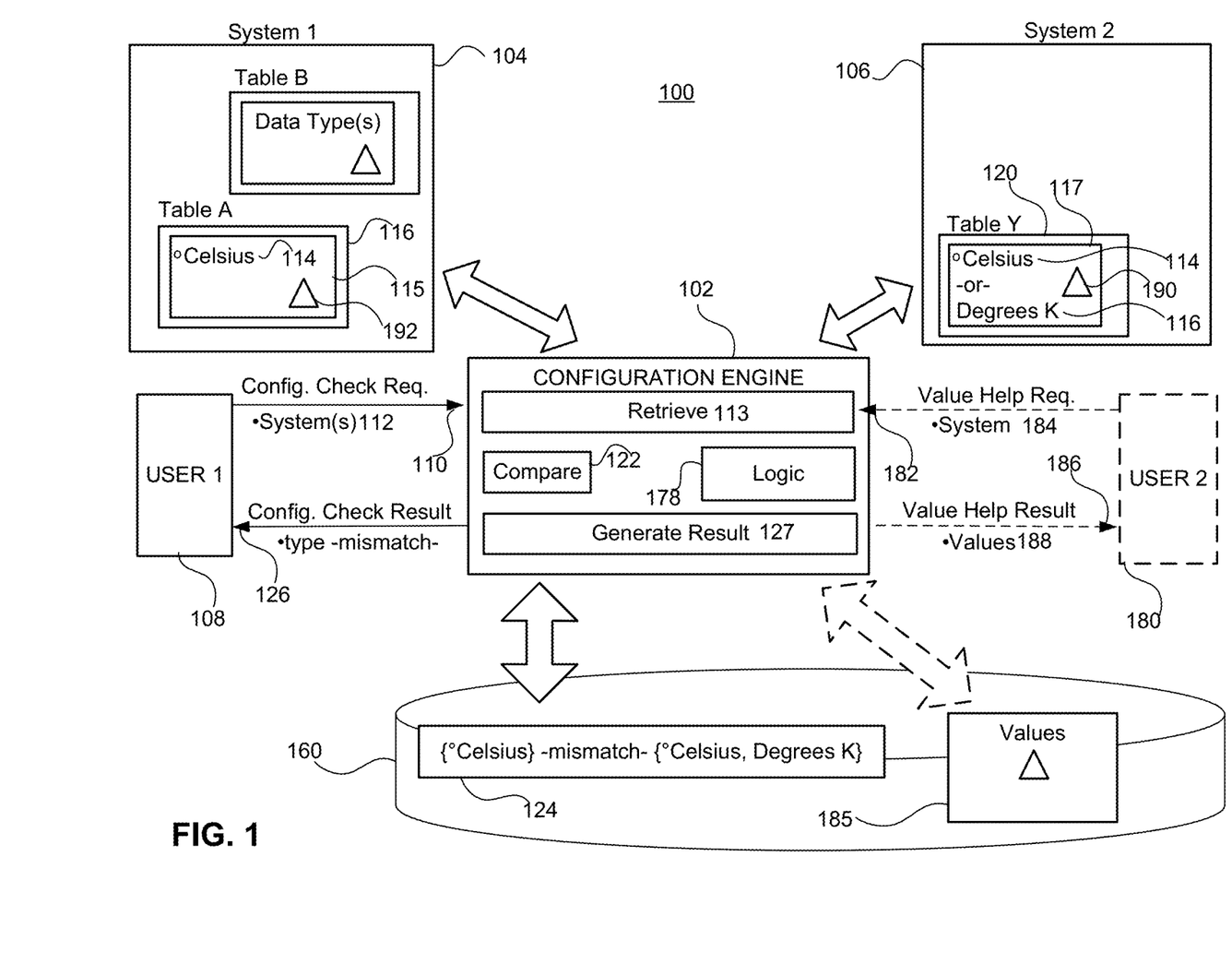
FIG. 1 shows a simplified diagram of a system according to an embodiment.

FIG. 1 shows a simplified view of an example system that is configured to implement configuration checking according to an embodiment. Specifically, system 100 comprises a configuration engine 102 that is in communication with two different systems: system 1 104 and system 2 106.

A first user 108 desires to perform configuration checking to determine any mismatches between data types. Accordingly, the first user inputs to the engine, a configuration check request 110 that includes parameters 112 specifying the two systems whose configurations are to be checked.

The engine receives this configuration check request, and in response retrieves 113 the data types from the specified systems. For System 1, the engine might retrieve a data type of:

"° Celsius" 114 for field 115 of the Table A 116.

By contrast, for System 2, the engine might retrieve two different data types:

"° Celsius" 114, or

"Degrees K" 116 for field 117 of the Table Y 120.

Then, the engine performs a comparison 122 of the data types of the two systems. Specifically, the engine determines that the System 2 may include a table field of data type:

"Degrees K", that would be unknown to the System 1.

Such inconsistency between the two systems could lead to failures and errors. Accordingly, a mismatch has been determined by the configuration checking. This mismatch 124 is stored in the underlying non-transitory computer readable storage medium 160, for example in a database.

The stored mismatch is then included in a result 126 that is generated 127 returned to the first user. The first user will now be aware of a specific inconsistency between the two systems, and can proactively take steps to avoid issues arising therefrom.

While FIG. 1 shows configuration checking as occurring between tables of different systems, this is not required. In some embodiments, the parameters of a configuration check request could specify different tables of a same system (e.g., Table A and Table B of System 1).

And, while FIG. 1 shows the engine returning a result of the configuration checking, some embodiments could go further to perform additional processing. For example, returning to the temperature units shown in FIG. 1, the engine could further include conversion logic 178.

Where a mismatch is determined, the engine could reference that logic to perform an action. In one example, the engine could perform a language processing to recognize that two apparently different retrieved data types, e.g.:

"° Celsius", and

"DEGREES C"

are in fact really the same despite there being differences in the specific strings, their cases, underlining, fonts, etc.

In another example, where the value 190 field of the table of the second system is recognized as being of the K (Kelvin) data type, the conversion logic could be applied by the engine to perform the (relatively simple) arithmetic operation to convert that value to the corresponding value 192 into Celsius temperature units for storage in the table of the first system.

Moreover, while FIG. 1 shows the configuration checking system returning a configuration check result and/or implementing a fix (such as a conversion of values), other potential uses are possible. For example, the configuration checking system could be used for performing a value help function.

In particular, a second user 180 could input a value help request 182 to the engine. Such a value help can allow the second user to gain an overall view of the state of operation of a system, and aid in diagnosing problems therein.

A parameter 184 of value help request could specify a particular system (e.g., System 1). In response, the engine could retrieve the values present in fields of tables across that specified system, storing the value help 185 in the non-transitory storage medium.

Then, the engine could generate a value help result 186 including those values 188, returning the value help result to the second user. Having such value help knowledge could be valuable in promoting recognition of system issues, and their correction.

Figure 2:
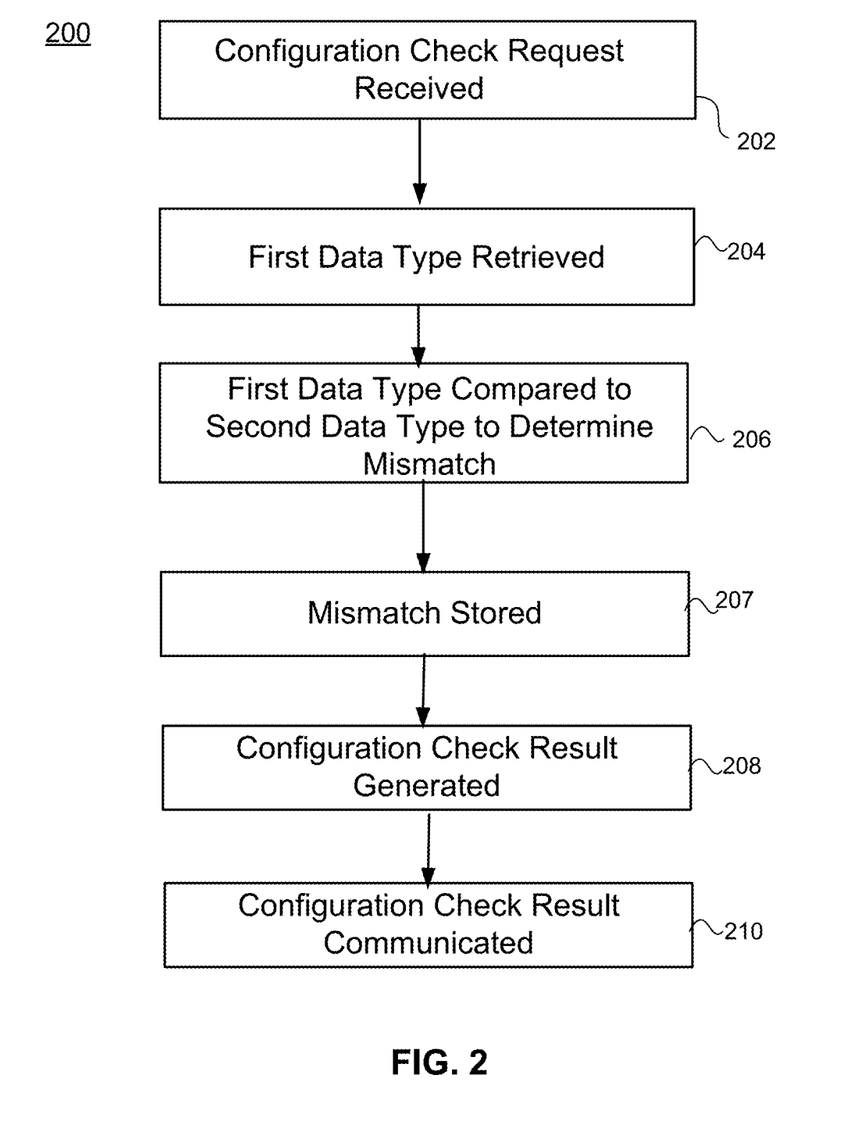
FIG. 2 shows a simplified flow diagram of a method according to an embodiment.

FIG. 2 is a flow diagram of a method 200 according to an embodiment. At 202, a configuration check request including a parameter specifying a system, is received.

At 204, based upon the parameter, a first data type of the system is retrieved. At 206, the first data type is compared with a second data type different from the first data type to determine a mismatch. At 207, the mismatch is stored.

At 208, a configuration check result including the mismatch is generated. At 210, the configuration check result is communicated.

Further details regarding configuration checking according to various embodiments, are now provided in connection with the following example.

Example

An example of an embodiment of performing cross-checking between systems is now described in connection the layout 300 of FIG. 3. In particular, this example relates to customizing between a system landscape 301 comprising a first, Convergent Charging (CC) system 302, and a second, Convergent Invoicing (CI) system 304.

Here, CI is an ABAP-based system available from SAP SE of Walldorf, Germany. CC is a Java-based system available from SAP SE.

Figure 3:
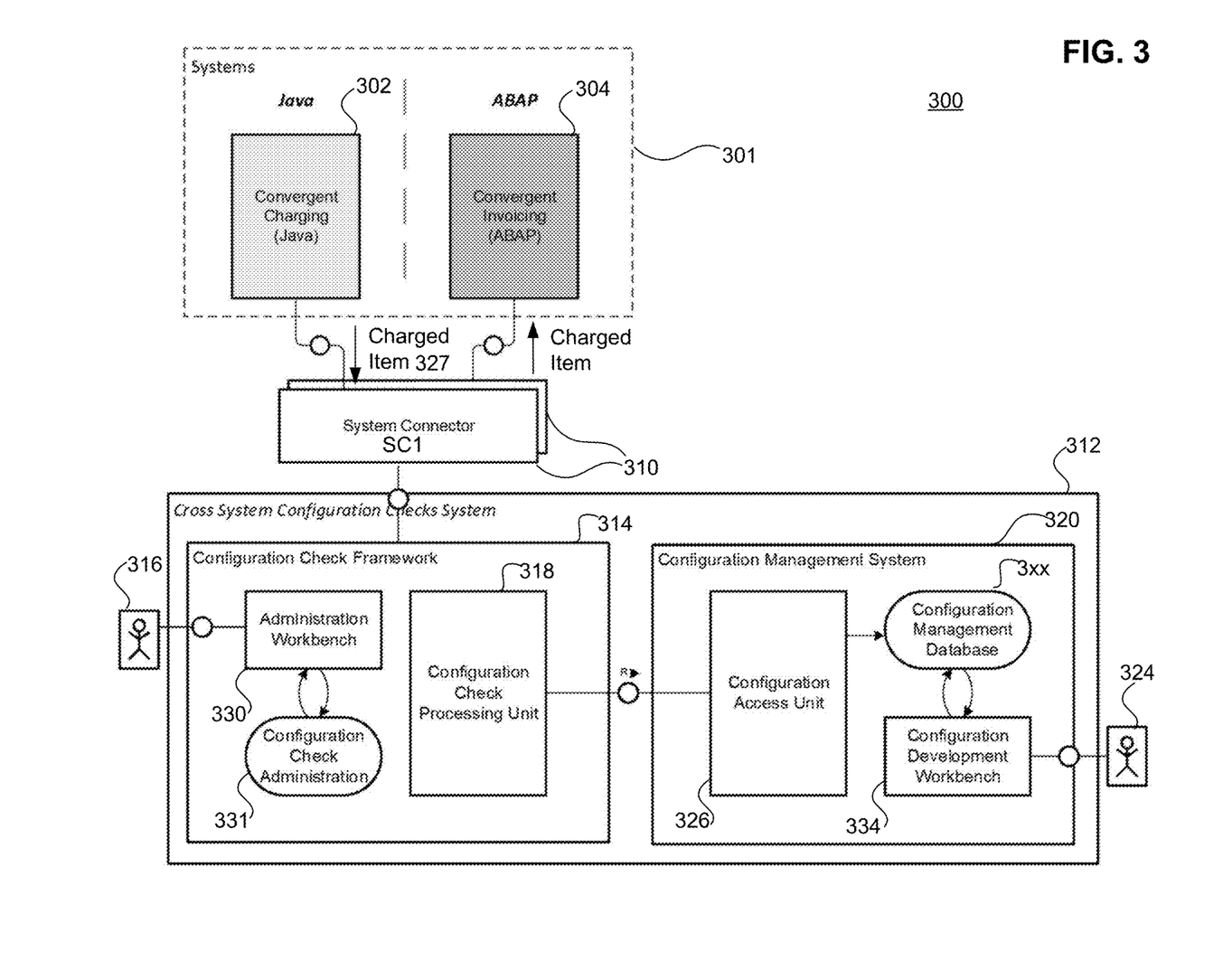
FIG. 3 shows a simplified diagram of a configuration checking system according to an example.

System connector(s) 310 of FIG. 3 are now described. Multiple systems can be connected via system connectors using the cross system configuration checks system 312.

Systems can be any system, including but not limited to those available from SAP SE of Walldorf Germany, and include Java and ABAP. The system connector is used as an interface between the systems and the cross system configuration checks system.

System connectors are also used for applications to call into the cross system configuration checks system in order to execute checks and comparisons implicitly from the application.

The configuration check framework 314 of FIG. 3 is now described. The system connector communicates with the configuration check framework which is part of the cross system configuration checks system.

End-Users 316 are using the configuration check framework to administer the system connections and to schedule automatic check runs. Furthermore, the framework processes the checks in the configuration check processing unit 318.

The configuration management system element 320 of FIG. 3 is now described. The configuration check framework is integrated with the configuration management system used by an end user or application developer 324 at a customer to implement logic of the cross-system checks.

The configuration access unit 326 is used for the integration and communication with the configuration check processing unit.

According to some embodiments, the configuration checks themselves can be products created on a separate check platform. Such a check platform that can be separately available and provide for partners to create the specific logic for the configuration checks.

As previously mentioned, CC and CI run on different systems—Java and ABAP, respectively. Both systems are connected via the system connectors, so that they can communicate with the cross system configuration checks system.

CC is a rating engine that is used to rate unrated consumption items of various kinds. CC creates charged items 327 out of unrated items, by determining who (an individual who purchased something) has to pay which amount (a price determination).

These charged items are sent to CI for further processing. In particular, CI creates billable items and then the billing and invoicing.

For the creation of billable items in CI, master data of the received items from CC needs to be correctly maintained in the items. For example, if the company code used by CC in the send items is unknown to the CI system, then the billable item cannot be posted in the CI system.

Accordingly, company code that is used must exist in CI. This principle applies to other fields as well.

Provision of fields recognized between various systems, is achieved by customization. For this particular example of FIG. 3, the company code is now applied to billable item types (field name=BITTYPE).

The BITTYPE is the billable item type that describes together with the subprocess the significance of a billable item. Each item type is assigned to one or more subprocesses.

Here, it is noted that BITTYPE represents just one possible example from the CI application. Embodiments apply to relevant fields of other applications maintained by the customer. That is, a customer maintains which checks should run (e.g. for BITTYPE). The check itself (for "BITTYPE Comparison") is created by a developer who knows what needs to be checked (tables, fields, etc.)

Figure 4:
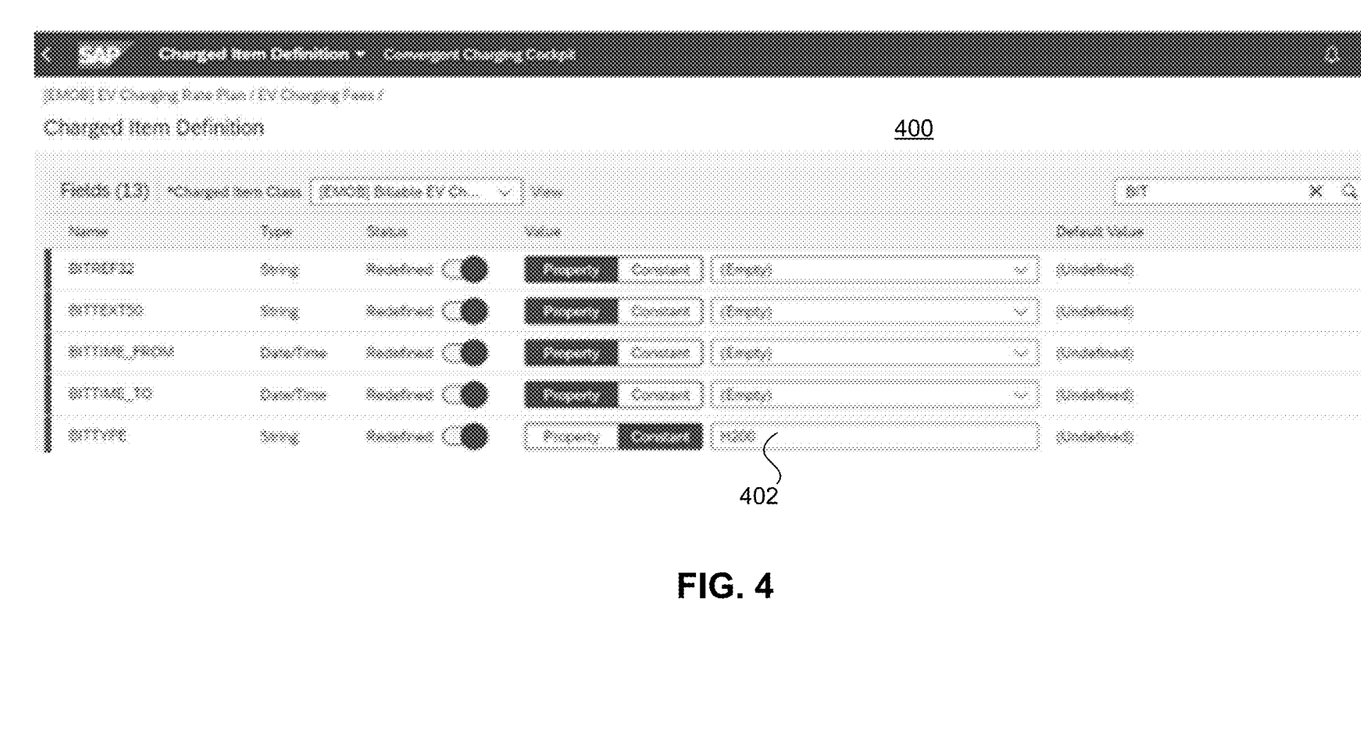
FIG. 4 shows a screen shot of one system of the example.

The customization of CC that allows it to recognize the BITTYPE of CI, is now described. FIG. 4 is a screen shot of CC showing customizing utilized for CI. The screen shot 400 includes an open string input field 402 where a user can enter a constant value for the creation of charged items. Here, the field BITTYPE uses the fixed value H200.

However, there may not be a check for CC to prove that H200 is a valid value. For example, not every system is able to perform a foreign key check across system boundaries.

Furthermore, the CC customizing may be stored in a separated database table with its own technical field names. That database table could have different names than those recognized in CI.

Figure 5:
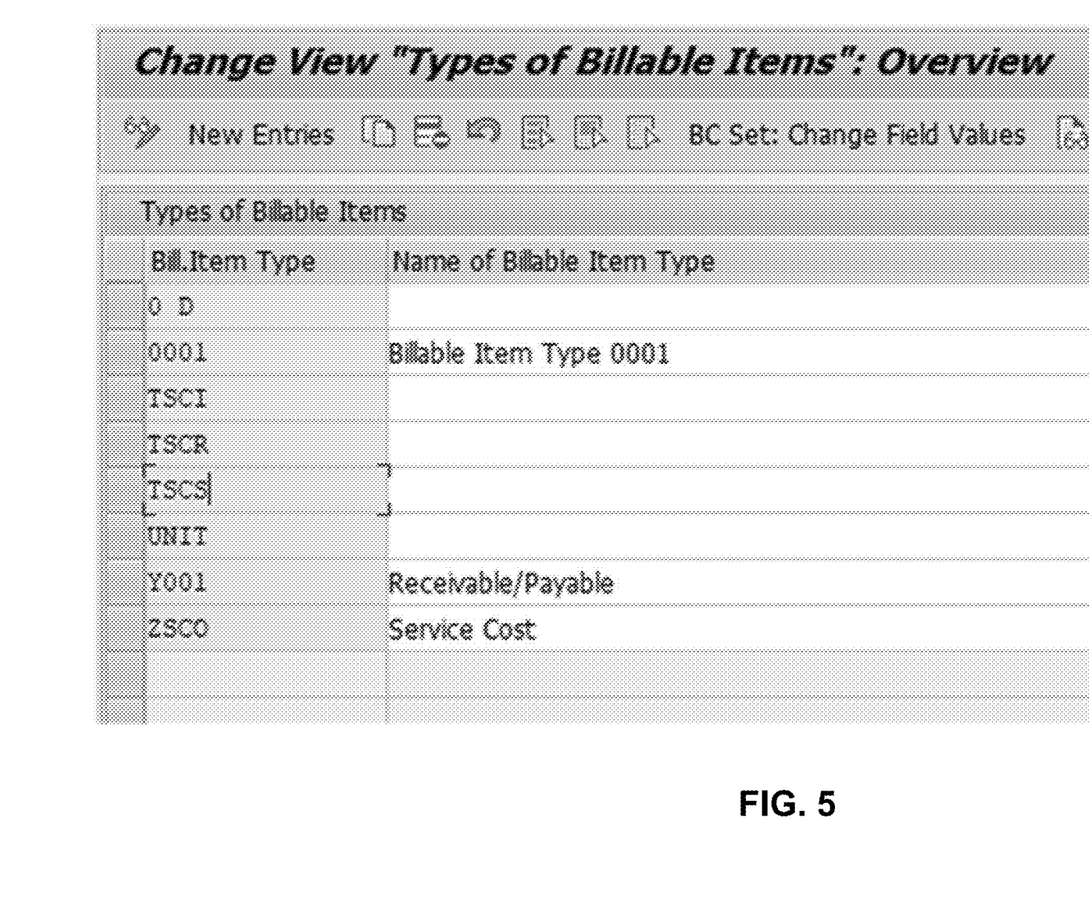
FIG. 5 shows a screen shot of another system of the example.

Convergent Invoicing customizing is now described. FIG. 5 is a screen shot showing customizing utilized for the CI system.

In the CI System, the customizing for the BITTYPE is different. That is, H200 is not a maintained value for BITTYPE. Therefore, it would not be possible for CI to create billable items out of the charged items from CC using BITTYPE H200.

Thus, returning now to FIG. 3, for cross-system configuration checking according to embodiments, the end-user on customer site connects the two different systems with the Cross-System Configuration Check System via the System Connectors.

Furthermore, the end user maintains in the Administration Workbench 330, what checks should run and when, according to configuration check administration 331. The checks have been implemented upfront by an application developer and can be chosen in the Administration Workbench.

The checks themselves have the knowledge about what needs to be checked with what, and how. So, in this example the check could have the following information, where SC1=System Connector 1 for CC, and SC2=System Connector 2 for CI.

SC1-BITTYPE_CUSTOMIZING-BITTYPE [ENTRIES INCLUDED IN] SC2-TFK8102-BITTYPE

The above information is enough to compare the BITTYPE between CC and CI. In particular, here we know the tables in the different systems:

BITTYPE_CUSTOMIZING for CC, and
TFK8102 for CI.

The following offers a concrete example based on the screenshots of FIGS. 4 and 5. In this example configuration, checking on the application side (e.g., SAP Application Developer) is first described.

Specifically, the application developer defines and implements rules to deliver as "health check". Here, this is the above-mentioned:

SC1-BITTYPE_CUSTOMIZING-BITTYPE [ENTRIES INCLUDED IN] SC2-TFK8102-BITTYPE.

Figure 6:
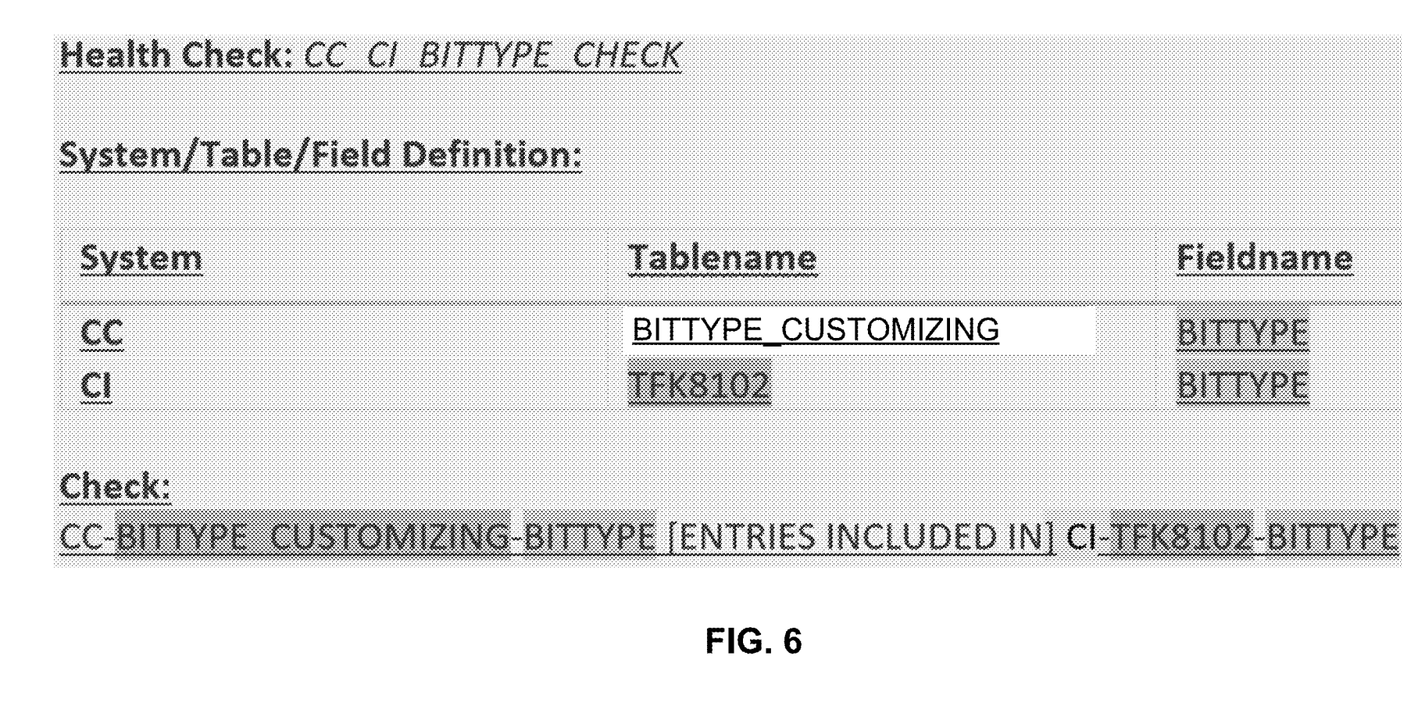
FIG. 6 shows a simplified configuration checking rule according to the example.

A sample rule for this example is shown in FIG. 6. FIG. 6 represents just one possibility, and could be implemented by coding.

Turning now to the customer side, the administrator uses the Administration Workbench 334 and configuration management database 336 to setup two System Connectors:

SC1 with information to access CC-System
SC2 with information to access CI-System The administrator selects the following health check for scheduling and execution:

CC_CI_BITTYPE_CHECK.

The system then knows what needs to be checked based on the implemented rule (CC_CI_BITTYPE_CHECK) and the settings made by the administrator.

The system knows which two systems need to be compared:
SC1 (CC)-SC2 (CI).
The system knows which table entries need to be used:
BITTYPE_CUSTOMIZING (for the Convergent Charging System) and TFK8102 (for the Convergent Invoicing System).
The system knows which fields need to be considered:
BITTYPE.
And, the system knows what needs to be "executed/done" by the check:
[ENTRIES INCLUDED IN]
Accordingly, the system could now:
access both of the systems,
get the BITTYPE data of both tables, and
check if the rule [ENTRIES INCLUDED IN] is valid.
If the rule is valid, the system is healthy. If the rule is not valid, various different options may possible.

Under one option, the developer could implement a repair routine in the Health Check. The repair routine could be manually executed by the administrator, or be setup automatically to be executed after the check. In some circumstances, this would allow a quick fix without manual intervention.

Under another option, a notification about the result could be sent. This notification could trigger the execution of follow-up tasks, such as manual correction of issues via automatic ticket creation.

It is noted that apart from the scenarios specifically mentioned above, at least the following two others are possible.
1. Explicit: End-User administrated the Check Execution. The check is being executed manually or automatically from the Cross-System Configuration Check System. The System Connector gathers the data from the separate systems and runs the maintained checks and returns the result.
2. Implicit: Application Developer implements logic to trigger the check execution. The check runs automatically when the end-user maintains the BITTYPE H200 by calling the Cross System Configuration Checks System and executing the check and to return the result to the CC system.

Accordingly, there are both implicit (by applications supporting the Cross System Configuration Check System), and explicit (automatic/manual execution via Cross System Configuration Check System) options for implementing cross system checks.

Still other use-cases are possible. Specifically, the previous example showed how to check two different applications on two different systems. Embodiments, however, are not limited to such an environment.

Alternatively, different applications could be running on one physical machine. A grouping of checks, groups system checks to logical groups that can be executed together.

Thus, checks can implement logic within one application. For example, checks may know that Customer Accounts must be assigned to a valid company code to work properly. The check implements the logic that for an SAP S/4 System in the financial area.

This relevant assignment has been done, and embodiments can propose a fix. Thus checks are not limited to checking, but can also contain logic for correcting the issue.

Embodiments may offer benefits in the area of configuration cross-checking between systems. Rather than involving checking of identical tables as between systems, embodiments offer intelligent health checks that allow comparison across different systems and tables not necessarily having the same tables for semantically identical things.

Embodiments further allow checking across different runtime environments (e.g., ABAP2Java, ABAP2third-party). Embodiments may also provide automatic follow-up activities, such as automatic service ticket creation and/or notification.

Returning now to FIG. 1, there the particular embodiment is depicted with the check engine as being located outside of the database. However, this is not required.

Rather, alternative embodiments could leverage the processing power of an in-memory database engine (e.g., the in-memory database engine of the HANA in-memory database available from SAP SE), in order to perform various functions as described above.

Figure 7:
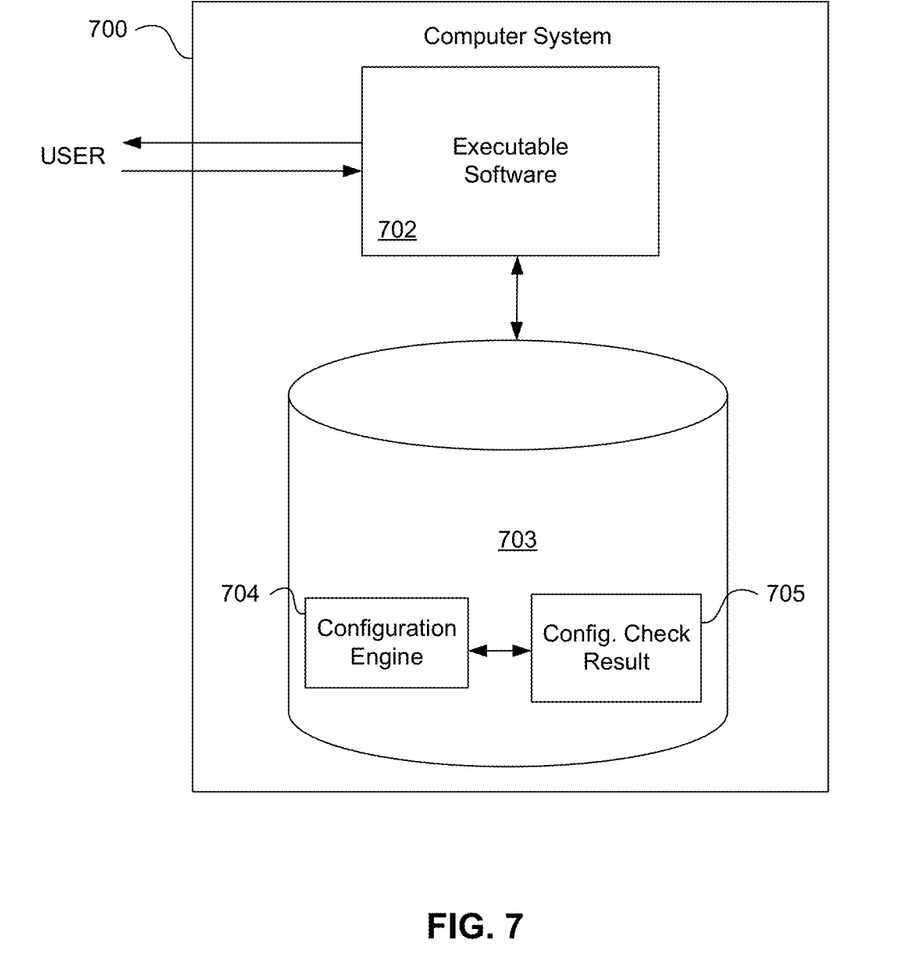
FIG. 7 illustrates hardware of a special purpose computing machine configured for implementing cross-checking according to embodiments.

Thus FIG. 7 illustrates hardware of a special purpose computing machine configured to perform configuration checking according to an embodiment. In particular, computer system 701 comprises a processor 702 that is in electronic communication with a non-transitory computer-readable storage medium comprising a database 703. This computer-readable storage medium has stored thereon code 705 corresponding to a configuration engine. Code 704 corresponds to a mismatch. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
- receiving a configuration check request including a parameter specifying a first system;
- based upon the parameter, retrieving a first data type of a first table of the first system;
- based upon the configuration check request, retrieving a second data type of a second table;
- comparing the first data type with the second data type to determine a mismatch;
- storing the mismatch in a non-transitory computer readable storage medium;
- generating a configuration check result including the mismatch; and
- communicating the configuration check result for display.

Example 2. The computer implemented system and method of Example 1 wherein the second data type is retrieved from the second table of a second system specified by another parameter of the configuration check request.

Example 3. The computer implemented system and method of Examples 1 or 2 further comprising referencing logic to convert a first value of the first data type to a second value of the second data type.

Example 4. The computer implemented system and method of Examples 1, 2, or 3 further comprising communicating a notification of the mismatch to a user.

Example 5. The computer implemented system and method of Examples 1, 2, 3, or 4 wherein the non-transitory computer readable storage medium comprises an in-memory database, and the comparing to determine the mismatch is performed by an in-memory database engine of the in-memory database.

Example 6. The computer implemented system and method of Example 1, 2, 3, 4, or 5 wherein the second data type is retrieved from the first system.

Example 7. The computer implemented system and method of Example 6 further comprising:
- receiving a value help request;
- retrieving a first value of the first data type from the first table;
- retrieving a second value of the second data type from the second table;
- generating a value help result including the first value and the second value.

Example 8. The computer implemented system and method of Examples 1, 2, 3, 4, 5, 6, or 7 wherein the mismatch is determined from the first data type being different from the second data type.

Example 9. The computer implemented system and method of Example 8 further comprising referencing logic to convert a first value of the first data type to a second value of the second data type.

Figure 8:
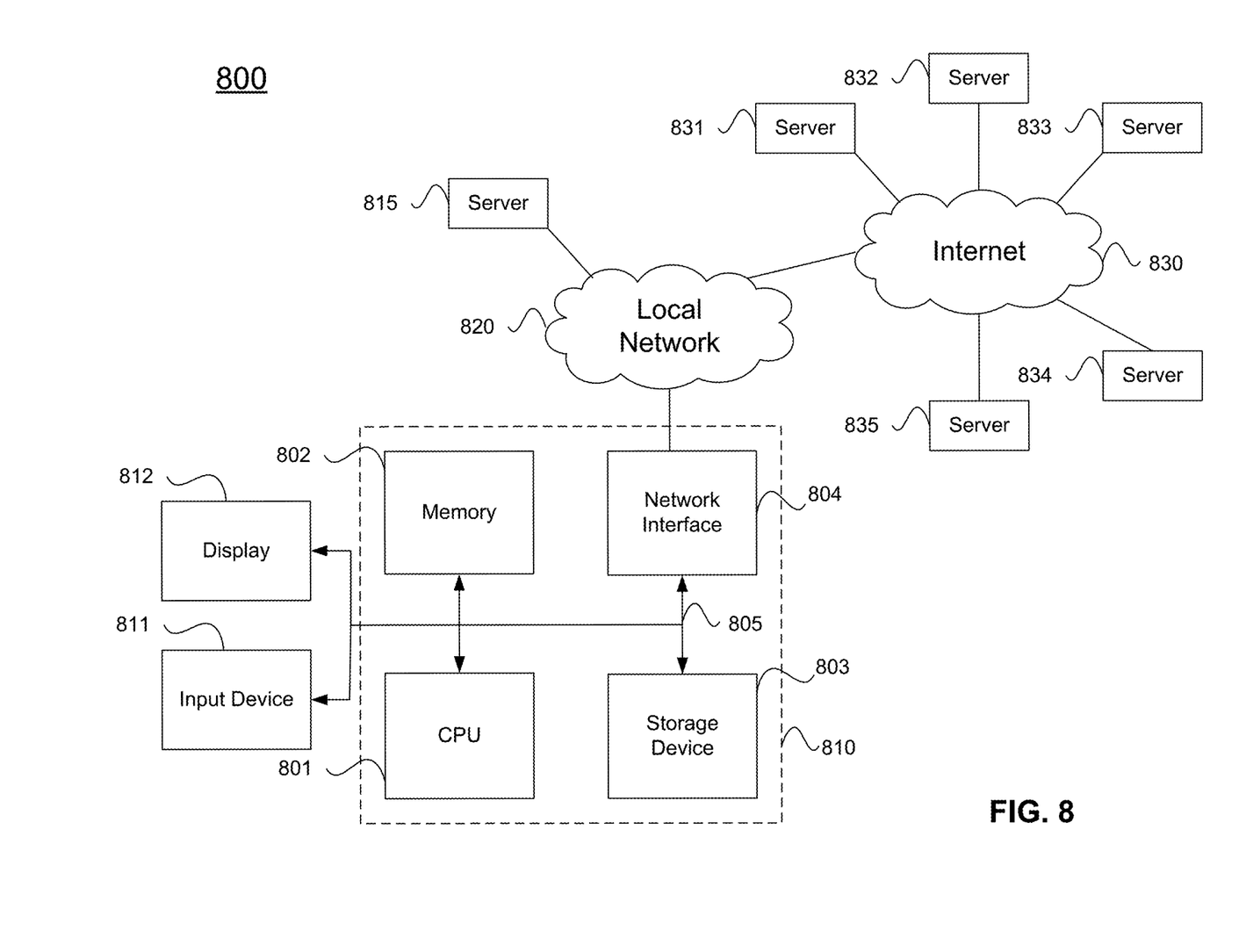
FIG. 8 illustrates an example computer system.

An example computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a Light Emitting Diode (LED) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method implemented in a computer system comprising one or more processors and a non-transitory computer readable storage medium, the method comprising:
    receiving a configuration check request, the configuration check request including a first parameter specifying a first software application and a second parameter specifying a second software application, wherein the configuration check request is for determining data type mismatches between the first software application and the second software application;
    based upon the first parameter, retrieving a first data type of a first table field of a first table of the first software application, wherein the first table field stores a first numeric data element in the first software application and the first data type describes the first numeric data element;
    based upon the second parameter, retrieving a second data type of a second table field of a second table of a second software application, wherein the second table field stores a second numeric data element in the second software application and the second data type describes the second numeric data element, and wherein the first data type and second data type describe a same attribute of the first and second numeric data elements;
    comparing the first data type with the second data type to determine a data type mismatch between the first software application and the second software application;
    storing the mismatch in the non-transitory computer readable storage medium;
    generating a configuration check result including the mismatch; and
    based on the configuration check result, performing an arithmetic operation to convert the second data element from a first value to a second value so that the second data type of the second data element on the second software application matches the first data type of the first data element on the first software application.

2. A method as in claim 1 further comprising:
    receiving a value help request;
    retrieving a first value of the first data type from the first table;
    retrieving a second value of the second data type from the second table;
    generating a value help result including the first value and the second value.

3. A method as in claim 1 wherein the mismatch is determined from the first data type being different from the second data type.

4. A method as in claim 3 wherein the mismatch is determined from:
    the first table comprising a first set including the first data type and not including the second data type, and
    the second table comprising a second set including the first data type and the second data type.

5. A method as in claim 1 further comprising communicating a notification of the mismatch to a user.

6. A method as in claim 1 wherein:
    the non-transitory computer readable storage medium comprises a database, wherein the database comprises a database engine; and
    wherein the database engine performs the comparing to determine the mismatch.

7. A method as in claim 1 wherein the first software application and the second software application are deployed on a single cloud computing landscape.

8. A method as in claim 1 wherein the configuration check request is received in a third software application, and wherein, based on the first parameter, the third software application connects to the first software application, and based on the second parameter, the third software application connects to the second software application, wherein the third software application performs said comparing step and said arithmetic operation.

9. A method as in claim 1 wherein the same attribute is a temperature.

10. A non-transitory computer readable storage medium comprising a computer program that, when executed by a computing system comprising one or more processors, causes the computing system to:
    receive a configuration check request, the configuration check request including a first parameter specifying a first software application and a second parameter specifying a second software application, wherein the configuration check request is for determining data type mismatches between the first software application and the second software application;
    based upon the first parameter, retrieve a first data type of a first table field of a first table of the first software application, wherein the first table field stores a first numeric data element in the first software application and the first data type describes the first numeric data element;
    based upon the second parameter, retrieve a second data type of a second table field of a second table of a second software application, wherein the second table field stores a second numeric data element in the second software application and the second data type describes the second numeric data element, and wherein the first data type and second data type describe a same attribute of the first and second numeric data elements;
    compare the first data type with the second data type to determine a data type mismatch between the first software application and the second software application;
    store the mismatch in the non-transitory computer readable storage medium;
    generate a configuration check result including the mismatch; and
    based on the configuration check result, perform an arithmetic operation to convert the second data element from a first value to a second value so that the second data type of the second data element on the second software application matches the first data type of the first data element on the first software application.

11. A non-transitory computer readable storage medium as in claim 10 wherein the mismatch is determined from the first data type being different from the second data type.

12. A non-transitory computer readable storage medium as in claim 11 wherein the mismatch is determined from:
the first table comprising a first set including the first data type and not including the second data type, and
the second table comprising a second set including the first data type and the second data type.

13. A non-transitory computer readable storage medium as in claim 10 wherein the computer program, when executed by the computing system, further causes the computing system to:
receive a value help request specifying the first software application;
retrieve a first value of the first data type from the first table;
retrieve a second value of a third data type from a third table of the first software application; and
generate a value help result including the first value and the third value.

14. A computer system comprising:
one or more processors;
a software program, executable on said computer system, the software program configured to cause a database engine of a database to:
receive a configuration check request, the configuration check request including a first parameter specifying a first software application and a second parameter specifying a second software application, wherein the configuration check request is for determining data type mismatches between the first software application and the second software application;
based upon the first parameter, retrieve a first data type of a first table field of a first table of the first software application, wherein the first table field stores a first numeric data element in the first software application and the first data type describes the first numeric data element;
based upon the second parameter, retrieve a second data type of a second table field of a second table of a second software application, wherein the second table field stores a second numeric data element in the second software application and the second data type describes the second numeric data element, and wherein the first data type and second data type describe a same attribute of the first and second numeric data elements;
compare the first data type with the second data type to determine a data type mismatch between the first software application and the second software application;
store the mismatch in the non-transitory computer readable storage medium;
generate a configuration check result including the mismatch; and
based on the configuration check result, perform an arithmetic operation to convert the second data element from a first value to a second value so that the second data type of the second data element on the second software application matches the first data type of the first data element on the first software application.

15. A computer system as in claim 14 wherein the mismatch is determined from the first data type being different from the second data type.

16. A computer system as in claim 15 wherein the mismatch is determined from:
the first table comprising a first set including the first data type and not including the second data type, and the second table comprising a second set including the first data type and the second data type.

* * * * *